May 21, 1929.   A. R. SOLTÉSZ   1,713,984
SEED PLANTING MACHINE
Filed April 13, 1927
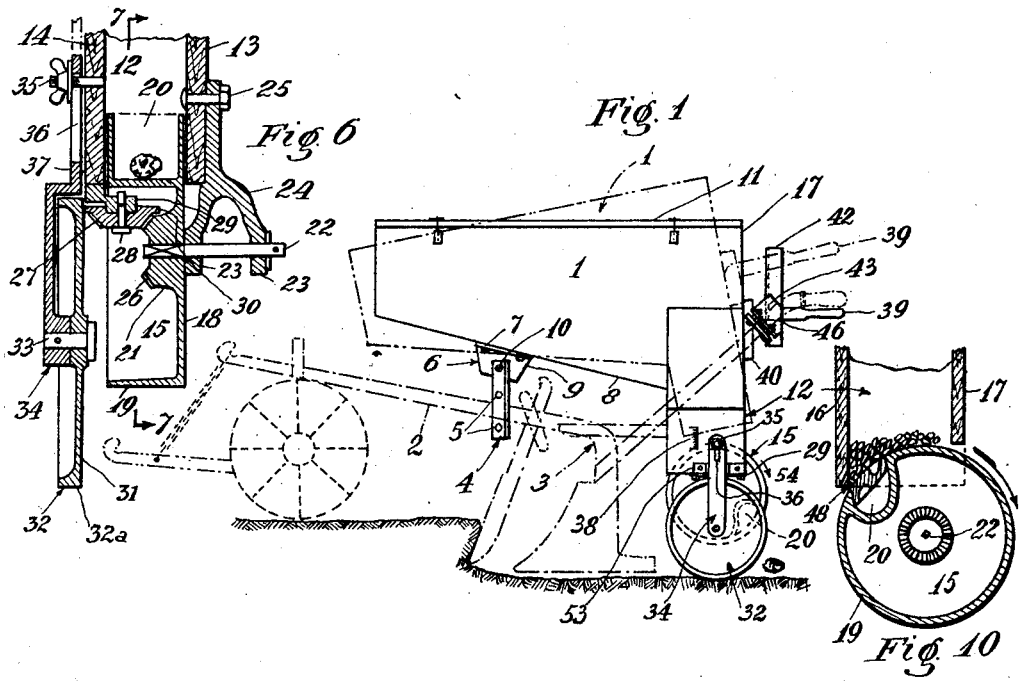
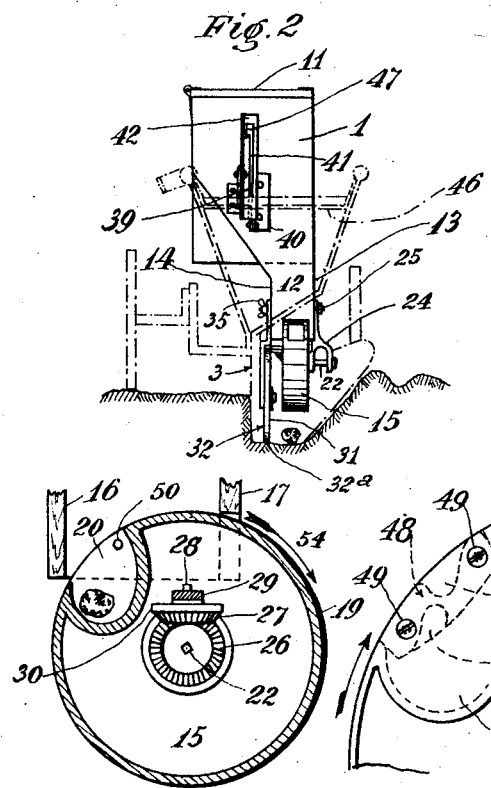
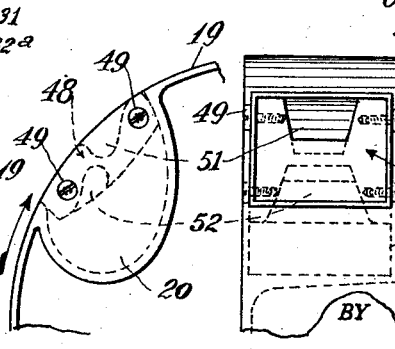
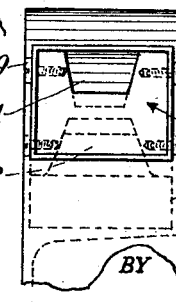
INVENTOR.
Adalbert R. Soltész
BY
ATTORNEYS.

Patented May 21, 1929.

1,713,984

UNITED STATES PATENT OFFICE.

ADALBERT R. SOLTÉSZ, OF CONNELLSVILLE, PENNSYLVANIA.

SEED-PLANTING MACHINE.

Application filed April 13, 1927. Serial No. 183,274.

This invention relates to agricultural machines and more in particular to automatic planting machines for potatoes and corn.

The primary object of this invention is to provide a machine to be used in connection with an ordinary plow for planting seeds simultaneously with the plowing of the ground. Another object of this invention is to provide a planting apparatus which may be readily attached to or removed from a plow, whenever required. A further object is the provision of an automatic planter wherein the spacing of the seeds in the ground may be regulated to suit conditions and the kind of seed planted. Still another object is to provide an automatic planter which is relatively simple in construction and operation, efficient and durable. Additional features and advantages of this invention will appear from the following description considered in connection with the accompanying drawing forming a part of this application, and in which:

Fig. 1 is a side elevation of my apparatus as mounted upon a plow, indicated in dot and dash lines.

Fig. 2 is a rear end elevation of Fig. 1.

Figs. 3 and 4 show respectively an end view and a side elevation of the lifting handle and associated parts for lifting or lowering the so-called seed-hopper.

Fig. 5 is an elevation of the support used for rockably mounting the planter on the beam of a plow.

Fig. 6 is a cross-sectional view through the seed-drum and operating mechanism thereof.

Fig. 7 is a sectional view taken on line 7—7 in Fig. 6.

Fig. 8 is a fragmentary side view of the seed-pocket of the seed-drum, with a special insert for planting corn.

Fig. 9 is a front elevation of Fig. 8.

Fig. 10 is a fragmentary sectional view showing the application of the seed-drum for planting corn.

Reference being had to the drawing, my planter consists of a seed container or hopper 1 which is rockably mounted upon the beam 2 of the plow 3 by means of the supporting bars 4 clamped to the plow-beam by means of bolts 5 and the angle-plates 6 the horizontal flanges 7 of which are securely bolted to the rearwardly inclined bottom 8 of the hopper, whereas the vertical flanges 9 are rockable intermediate the supports 4 on a pivot-bolt 10. A hinged cover 11 is used to close the top of the hopper.

At its rear end the hopper has a chute 12, the sidewalls 13 and 14 of which are adequately spaced to receive therebetween the snug fitting seed-drum 15, and the front and rear walls 16, 17 reach down very close to the periphery of the seed-drum, to prevent any loss of seeds.

As shown especially in Figs. 6 and 7, the seed-drum 15 comprises a disc portion 18 having a peripheral flange 19 in which is formed the suitably shaped seed-pocket 20, closed on both sides and bottom but open on the periphery. The seed-drum has on the inside a central hub 21 in which is secured the shaft 22 mounted for rotation in the two bearings 23 provided at the lower end of a bracket 24, fastened by bolts 25 on the side-wall 13.

Secured to, or formed integrally with, the hub 21 is a bevel gear 26 which meshes with another bevel gear 27 freely mounted upon a pin 28 secured in a support 29 bolted to the lower end of the side-wall 14 of the chute 12. The bevel gear 27 has a finished circular flange 30 which frictionally engages the smooth disc portion 31 of the track-wheel 32, the rim 32ª of which normally travels on the bottom of the furrow made by the plow. This track-wheel runs on a stationary pin-shaft 33 secured in the lower part of the track-wheel-support 34 which is mounted for vertical adjustment along the side-wall 14 by means of a clamping bolt 35 which slidably engages a slot 36 provided in the upper arm 37 of said support. The latter is additionally guided between the parallel guides 53 which are bolted to the chute.

As will be readily understood, by raising the track-wheel, the friction flange 30 of the bevel gear 27 will be brought nearer the center of the track-wheel and the number of revolutions of the seed-drum for each turn of the track-wheel will be reduced accordingly; thus increasing the spacing of the seeds in the ground. Conversely, by increasing the speed of rotation of the seed-drum, the spacing of the seeds will be reduced.

The proper adjustment of the seed-drum for a desired spacing of the seeds is determined by referring to a scale 38, suitably located on the side of the chute and whereby the track-wheel-support 34 may be adjusted to the required height.

When the plow has to be turned about at the end of a furrow, or when it is desired to discontinue the seeding operation in a certain portion of a furrow, the planting operation is interrupted by lifting the track-wheel out of engagement with the bottom of the furrow. This is done by means of the lifting-handle 39 which is secured to an angle-bar 40 fastened in any desired manner to the rear wall 17 of the hopper. The lifting-handle is guided for vertical movement in a slot 41 cut in a guide-post 42 which is securely mounted by means of the clamping plates 43, 44 and the clamp-bolts 45 to the cross-bar 46 of the plow. At the upper portion of the slot 41 there is a notch 47 which may be engaged by the lifting-handle to hold the seed-drum and hopper into the inoperative position shown in broken lines in Fig. 1. As will be understood, the effort required for tilting the hopper and depending seed planting mechanism may be reduced to a minimum by locating the hinged supporting means of the hopper as near the center of gravity thereof as possible.

The size of the seed-pocket 20 is appropriate for planting potatoes. When the machine is to be used for planting corn, or other similar seeds of reduced dimensions, an insert-plate 48 is placed in the seed-pocket and removably secured therein by means of screws 49 engaging suitable apertures 50 provided in the seed-drum. The insert-plate is preferably made reversible by giving to its two faces the same curvature as the seed-drum. Seed-pockets 51 and 52, of different sizes to suit the nature of the seeds used, are provided in said faces.

From the foregoing description it is thought that the operation of my automatic planter will be readily understood and may be succinctly stated to be as follows: Assuming that it is intended to plant potatoes, the potato seed-pieces are placed in the hopper 1 and the track-wheel properly adjusted, by means of the scale 38, for the desired spacing. The lifting-handle is then dropped into its lower, the operative, position and the plow pulled forward. The rotation of the track-wheel causes the seed-drum to rotate in the direction of the arrow 54; a potato seed-piece will be carried away in the seed-pocket 20 at each turn of the seed-drum and dropped rearwardly in the just opened furrow, where said seed-piece will lay exposed until it is covered with earth thrown over from the next following parallel furrow.

Upon reaching the end of a furrow, the operator lifts the complete planting apparatus into inoperative position, in the manner described hereinbefore, prior to reversing his plow.

As will be understood, there may be slight changes made in the construction and arrangement of the details of my invention without departing from the field and scope of the same, and I intend to include all such variations, as fall within the scope of the appended claims, in this application in which the preferred form only of my invention has been disclosed.

I claim:

1. In a seed-planter, a seed-hopper; a chute therefor; a cylindrical seed-drum positioned at the outlet of said chute and adapted to close the same; a seed-pocket positioned circumferentially on said seed-drum; a track-wheel; a support therefor guided for vertical adjustment on said chute; means for securing said support into adjusted position, and friction actuated means for revolving said seed-drum by said track-wheel.

2. In a seed-planter, a seed-hopper; a chute therefor; a cylindrical seed-drum positioned at the outlet of said chute and adapted to close the same; a seed-pocket positioned circumferentially on said seed-drum; a track-wheel comprising a rim and a flat disc-member; a support for the track-wheel guided for vertical adjustment on said chute; means for securing said support into adjusted position; a gear positioned centrally on said seed-drum; a second gear meshing with the first mentioned gear, said second gear having a circumferential flange which frictionally engages said disc-member for the purpose of rotating the seed-drum.

In testimony whereof I affix my signature.

ADALBERT R. SOLTÉSZ.